UNITED STATES PATENT OFFICE.

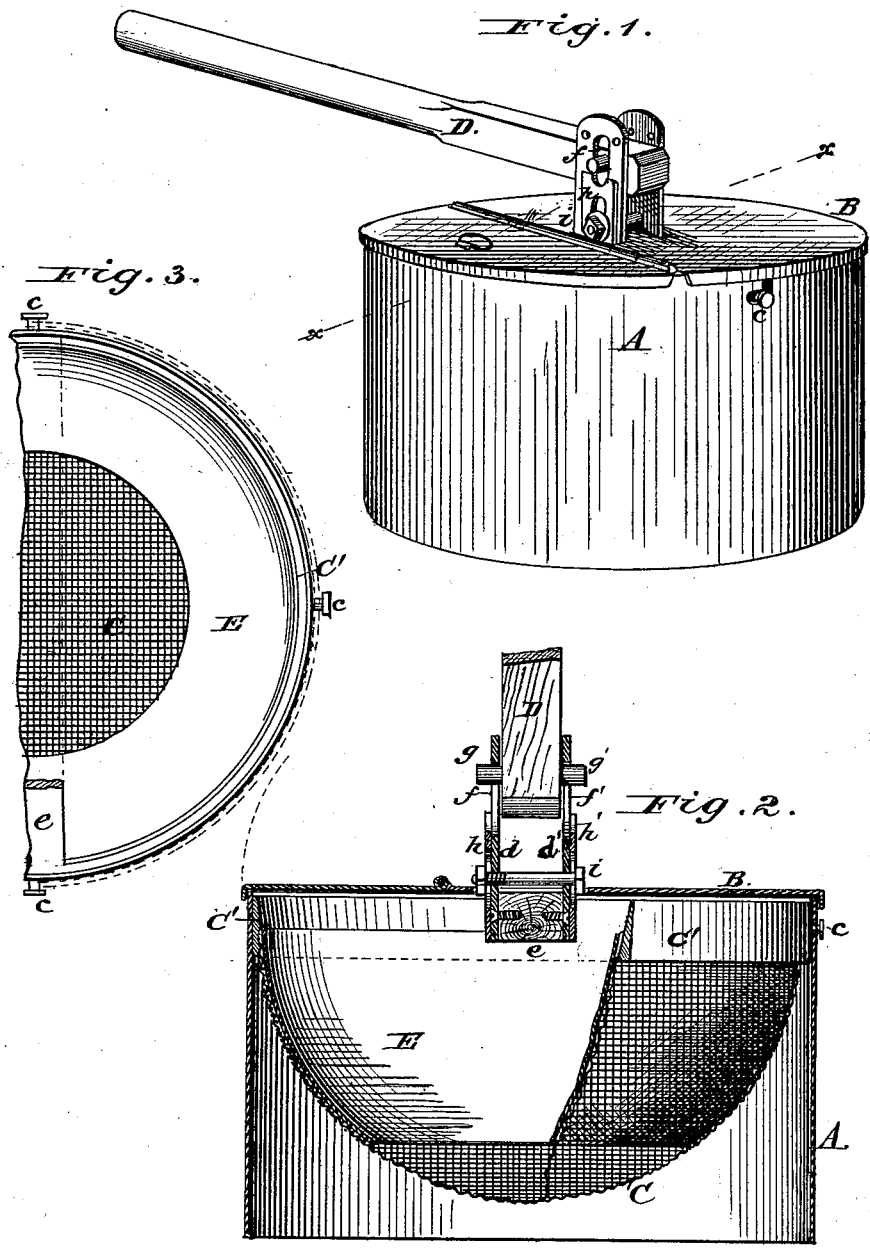

CHRISTIAN W. NIVER, OF PORT ROYAL, SOUTH CAROLINA.

IMPROVEMENT IN INSECT-DESTROYING DEVICES.

Specification forming part of Letters Patent No. 195,155, dated September 11, 1877; application filed May 17, 1877.

*To all whom it may concern:*

Be it known that I, CHRISTIAN W. NIVER, of Port Royal, county of Beaufort, State of South Carolina, have invented certain new and useful improvements in devices for dusting potato, cotton, and other plants with paris-green or other substances, of which the following, taken in connection with the accompanying drawing, is a specification.

It is well known that, in the cultivation of cotton, potatoes, and other plants, much of the crop is destroyed by insects that feed upon the same. Especially is this the case with the Colorado beetle, which, during the past few years, has proved so very injurious to the farming community. Numerous experiments have been made looking to the annihilation of these insects when once upon the plants, in most of which steam or some pungent vapor has been employed, and in some instances attempts have been made to sprinkle the plants infested with paris-green and other similar poisonous substances.

The devices heretofore made use of for this latter purpose have been so complicated and expensive as to preclude their introduction into general use, and a cheaper and more simple apparatus for this purpose has long been a desideratum.

The object of my invention is therefore to produce a cheap, simple, and efficient duster, which shall be adapted alike to large and small plants; and it consists, first, in the arrangement of the handle and the device for carrying the materials to be distributed, whereby the said device may be shaken on the handle, and the amount of such movement varied at pleasure; second, in the arrangement, with the foraminous vessel for holding the materials to be distributed, of an apron for regulating the quantity of materials distributed, whereby either large or small plants may be treated without unnecessary waste; third, in certain constructions and combinations of parts, all of which will be specifically pointed out in the claims.

Referring to the drawings, Figure 1 represents a perspective view of my invention; Fig. 2, a sectional elevation taken on the line $x\ x$ of Fig. 1; and Fig. 3, a partial plan view of the same, with the top or cover removed.

A is a case of a cylindrical form, having a suitable cover, B, detachably secured thereto, one part of which may be hinged to the other, so as to admit of ingress to the interior of the said case.

C is a foraminous vessel, of hemispherical form, for holding the material or materials to be distributed, and having secured around its upper edge a suitable band, C', for strengthening the same, and to which are secured projections $c$, by means of which and suitably-formed slots the said vessel is detachably secured within the case A. $d\ d'$ are two standards or uprights, which may be secured to the cover B near its center; but in the present instance they are shown as passing through the said cover, and being secured to a suitable strip, $e$. These standards or uprights are slotted near their upper ends, as shown at $f f'$, for the reception of the pins or trunnions $g\ g'$, which project from the lever or handle D. This lever or handle may be of any preferred length, so that the device may be used by the side of, or at any desired distance from, the operator; and as the said pins or trunnions are free to slide in the slots $f f'$, the operation of the device is very much facilitated, since the said pins, in striking against the ends of the slots during the operation of shaking, materially assist in the passage of the material or materials being applied through the meshes of the holding-vessel. $h\ h'$ are slides or plates, adjustably secured by the bolt $i$ to the standards or uprights $d\ d'$, for the purpose of regulating the amount of movement of the pins or trunnions $g\ g'$ in the slots $f f'$.

E is an apron adapted to fit within the foraminous vessel C, and extends down to within a short distance of the bottom of said vessel, for the purpose of preventing the material from passing through the meshes thereof, except at the portion of the vessel below said apron. This apron is used only when small plants are to be dusted, in order to prevent unnecessary waste of the materials. At all other times it is removed, so as to admit of the said materials passing through all the meshes of the vessel; and, in order that the said apron may be removed from the vessel and the latter from the case, the cover of the same is detachable, it being secured to the case by means of an ordinary bayonet-joint.

The operation of the device is as follows:

The material to be dusted upon the plants is placed within the foraminous vessel C. The cover is then closed. The operator then takes the device by the handle, passes along beside the plants to be operated upon, and shakes the device over the same. The pins on the handle D, striking against the standards or uprights $d\ d'$, not only impart to the vessel a shaking but also a jarring movement, whereby the material being distributed is caused to pass through the meshes onto the plants.

The case A is constructed so as to extend some distance below the foraminous vessel, to serve for a support for the same when not in use, and also to protect the material, in its passage from the vessel to the plant, from the action of the wind.

I have described herein that the foraminous vessel C is provided, around its upper edge, with a metal strip. This, of course, is only necessary when the vessel is made of gauze, and in some instances when that material is employed it will be found unnecessary. In practice I have found that wire or linen gauze worked the most satisfactorily; but it is evident that perforated plates may be substituted therefor; and I do not, therefore, limit myself to any particular material.

I have described that the cover is secured to the case by the ordinary bayonet-joint; but it is obvious that any device which will admit of the said cover being removed may be substituted therefor.

Having thus fully described the nature and operation of my invention, what I claim as new, and desire to secure by Letters Patent, is—

1. The combination, with the cylindrical case A and cover B, having the standards or uprights $d\ d'$, provided with the slots $f\ f'$, of a handle or lever, D, having the pins or trunnions $g\ g'$, whereby not only a shaking motion may be imparted to the said case and its auxiliaries, but also a jarring movement, as and for the purposes described.

2. The combination, with the standards or uprights $d\ d'$, provided with the slots $f\ f'$, and the lever D, provided with the pins or trunnions $g\ g'$, of the adjustable plates $h\ h'$ and bolt $i$, whereby the amount of movements of the said pins or trunnions in the said slots may be regulated, as and for the purposes described.

3. In a device for dusting paris-green and other poisonous substances on cotton, potatoes, and other plants, the combination, with a hemispherical foraminous vessel for holding the said material, of an apron adapted to be applied thereto, as and for the purposes described.

CHRISTIAN W. NIVER.

Witnesses:
  GEO. B. MORRIS,
  BENJ. K. BLISS.